United States Patent
Neul et al.

(10) Patent No.: US 6,249,754 B1
(45) Date of Patent: Jun. 19, 2001

(54) DEVICE FOR DETERMINING THE ROTATIONAL SPEED

(75) Inventors: Reinhard Neul, Stuttgart; Dirk Lamprecht, Weinstadt, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/091,912
(22) PCT Filed: Oct. 2, 1997
(86) PCT No.: PCT/DE97/02264
§ 371 Date: Jun. 24, 1998
§ 102(e) Date: Jun. 24, 1998
(87) PCT Pub. No.: WO98/27402
PCT Pub. Date: Jun. 25, 1998

(30) Foreign Application Priority Data

Dec. 19, 1996 (DE) ................................. 196 53 021

(51) Int. Cl.$^7$ ..................................................... G01C 19/00
(52) U.S. Cl. .......................................... 702/145; 73/504.02
(58) Field of Search .................................. 702/145, 147; 73/504.02, 504.04

(56) References Cited

U.S. PATENT DOCUMENTS

| | | |
|---|---|---|
| 4,759,220 | 7/1988 | Burdess et al. . |
| 4,896,268 * | 1/1990 | MacGugan ............................ 364/453 |
| 5,600,064 * | 2/1997 | Ward .................................. 73/504.04 |
| 5,691,471 * | 11/1997 | Okazaki et al. ................. 73/504.041 |
| 5,890,099 * | 3/1999 | Abendroth ............................. 702/94 |

* cited by examiner

*Primary Examiner*—Patrick Assouad
(74) *Attorney, Agent, or Firm*—Michael J. Striker

(57) ABSTRACT

A device for determining a rotation rate can be employed in conjunction with a rotation rate sensor which furnishes one or two output signals that among other things are a measure for the Coriolis acceleration and thus also for the rotation rate. The device includes an arrangement for signal processing, with which both digital subtraction of the output signals and an ensuing digital multiplication by a carrier signal shifted in a digital phase shifter are accomplished. The digital multiplication is followed by a digital/analog conversion and low-pass filtration, which in the final analysis furnishes an output signal (DR) that is equivalent to the rotation rate.

13 Claims, 3 Drawing Sheets

DEVICE FOR DETERMINING THE ROTATIONAL SPEED

BACKGROUND OF THE INVENTION

The invention is based on a device for determining a rate rotation.

The use of rotation rate sensors that utilize the Coriolis effect is known in conjunction with systems for dynamic control in motor vehicles. Such rotation rate sensors typically comprise one or more masses that are set into mechanical oscillation at a constant frequency by an electrical oscillator circuit. One or more sensor elements are mounted on the mass or masses and output acceleration-dependent output signals and upon rotation of the oscillating system also detect the Coriolis acceleration acting on the oscillating masses. Such rotation rate sensors can be embodied for instance as micromechanical sensors. Typically, they are evaluated with the aid of an analog evaluation circuit. The problem in evaluating the signals of a rotation rate sensor is that the Coriolis acceleration signal, which is proportional to the rotation rate, must be extracted from the other signal components. In analog evaluation circuits, of the type known for instance from U.S. Pat. No. 4,759,220, complicated and expensive evaluation circuits are necessary.

SUMMARY OF THE INVENTION

The device according to the invention for determining a rotation rate has the advantage over the prior art of requiring only little expense for circuitry and calibration, which has pronounced advantages over analog concepts. The conversion of the acceleration signals into digital words with word widths that correspond to the resolution required is advantageously avoided. These advantages are attained by performing a purely digital processing, in which the pulse width modulated signal or sigma-delta encoded signals of the acceleration sensors are used directly. As a result, advantageously, sampling of the acceleration sensor signals is avoided, and thus it is possible to dispense with the attendant high sampling frequencies or sampling limitations, especially in the case of pulse-width-modulated acceleration signals.

BRIEF DESCRIPTION OF THE DRAWING

The invention is shown in the drawing and will described in further detail below. Individually.

DESCRIPTION OF THE PREFERRED EMBODIMENTS

Figure 1:
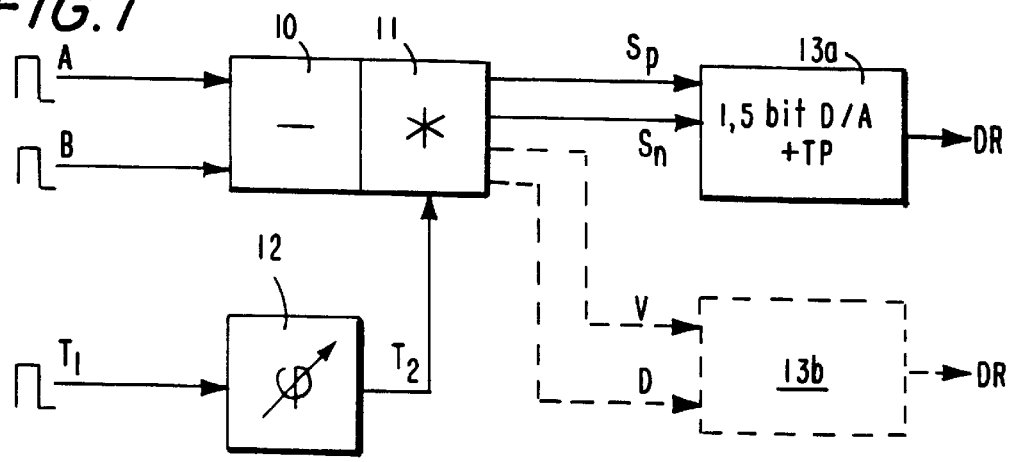
FIG. 1 shows a block circuit diagram of a digital signal processing according to the invention.

FIG. 1 shows a block circuit diagram of the proposed digital signal processing. This digital signal processing includes a block 10, in which the digital subtraction of the acceleration signals A and B takes place. These acceleration signals A and B each arrive from a respective acceleration sensor element. The signals are pulse width modulated signals or so-called sigma-delta signals. These signals include signal components that are caused by the acceleration of the oscillating masses of the rotation rate sensor and by the oscillations that occur from the influence of the Coriolis force.

Along with the block 10 for digital subtraction, the digital processing circuit includes a block 11 for digital multiplication. This block 11 for digital multiplication communicates with the block 10 for digital subtraction and also receives a signal $T_2$, which is generated in a digital phase shifter 12 from the rectangular carrier signal $T_1$. The carrier signal $T_1$ is obtained from the excitation signal for the oscillating body.

At the output of block 11, two signals occur, and the one signal V indicates the sign. The second signal D is a data bit. The two signals V and D or alternatively the signals $S_n$, $S_p$ to be explained later, are further processed in the digital/analog converter and low-pass filter 13a or in the digital low-pass filter 13b. At the output of the digital/analog converter and low-pass filter 13, the rotation rate DR is available, which represents the useful signal. The evaluation circuit of FIG. 1 requires no conversion of the input signals into digital words. It uses directly the pulse-width-modulated acceleration signals or the sigma-delta signals, which require only one bit for encoding. Examples of the makeup of the individual blocks 10, 11, 12 and 13 will be described in further detail hereinafter. Block 10 for digital subtraction and block 11 for digital multiplication can advantageously be combined into a signal Boolean switching network, which is described by the truth table shown in Table 1. By using such a Boolean switching network, unnecessary to sample the acceleration signals A and B.

TABLE 1

| $T_2$ | A | B | V | D | $S_p$ | $S_n$ | Value |
|---|---|---|---|---|---|---|---|
| 0 | 0 | 0 | 0 | 0 | 0 | 0 | 0 |
| 0 | 0 | 1 | 1 | 1 | 0 | 1 | −1 |
| 0 | 1 | 0 | 0 | 1 | 1 | 0 | +1 |
| 0 | 1 | 1 | 0 | 0 | 0 | 0 | 0 |
| 1 | 0 | 0 | 0 | 0 | 0 | 0 | 0 |
| 1 | 0 | 1 | 0 | 1 | 1 | 0 | +1 |
| 1 | 1 | 0 | 1 | 1 | 0 | 1 | −1 |
| 1 | 1 | 1 | 0 | 0 | 0 | 0 | 0 | logical switching networks in accordance with the following Boolean equations:

$$V = \bar{A}\ \overline{BT_2} + A\bar{B}\ T_2$$

$$D = A\bar{B} + \bar{A}\ B$$

$$S_p = A\bar{B}\ \overline{T_2} + \bar{A}\ BT_2$$

$$S_n = \bar{A}\ \overline{BT_2} + A\bar{B}\ T_2 = V$$

The meaning of the individual symbols is as follows:

V and D are the sign and the data bit in a two-complement illustration;

$S_p$ and $S_n$ stand for the positive and negative switching signals, respectively.

Figure 2:
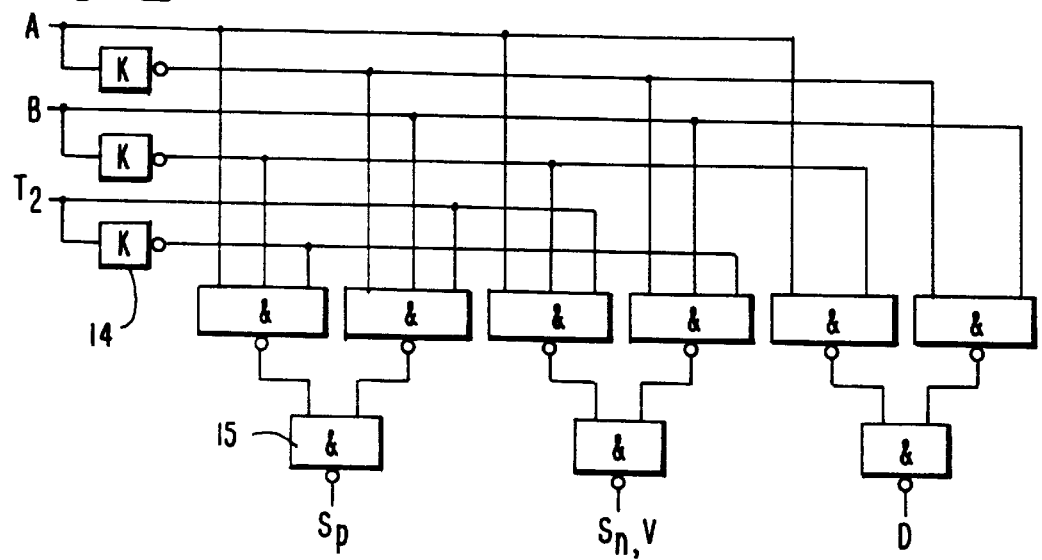
FIGS. 2 and 2a show two embodiments of a digital circuit with which the truth table shown in Table 1 can be realized.
Figure 2A:
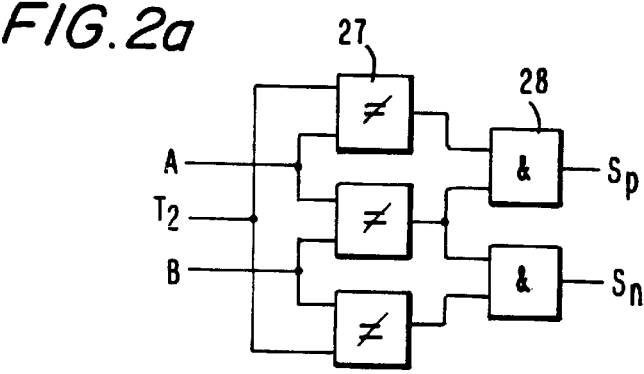

An electronic circuit with which the truth table shown in Table 1 can be realized in shown in FIG. 2. This circuit is supplied with the signals A, B and $T_2$. The circuit includes solely means for complement formation 14 and NAND gates 15 and at its outputs furnishes a positive switching signal $S_p$, a negative switching signal $S_n$ which corresponds to the sign V, and a data bit D. If only $S_p$ and $S_n$ are needed, then the circuit of FIG. 2a can also be used, which requires only three acceleration signals 27 and two AND gates 28.

For the further digital processing, the sign V and data bit D are of interest; the sign and data bit are obtained in a two-complement representation. The positive and negative switching signals $S_p$ and $S_n$ are also suitable for controlling the 1.5-bit digital/analog converter of FIG. 3. The output of the digital circuit of FIG. 2 recognizes three discrete values, −1, 0, and +1. The converter can therefore also be called a 1.5 bit converter, because a two-bit converter could process four discrete values.

Figure 3:
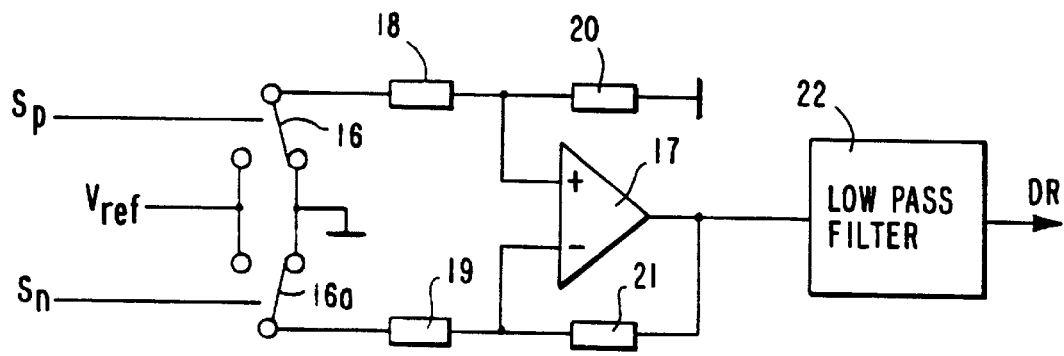
FIGS. 3 and 3a show two embodiments an exemplary embodiment for a digital/analog converter and low-pass filter.
Figure 3A:
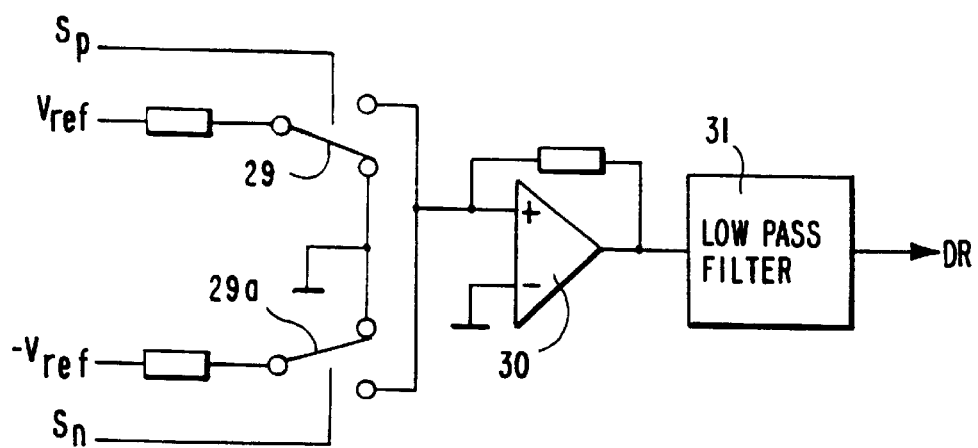

The digital/analog converter and low-pass filter 13 is shown in more detail in FIG. 3. An alternative circuit for this is shown in FIG. 3a. This circuit includes two switches 29 and 29a, each of which switches over between $V_{ref}$ and $S_p$ and $-V_{ref}$ and $S_p$, respectively. As a result, the downstream operational amplifier 30 is supplied at its inverting input with the signals $S_p$, $V_{ref}$, $-V_{ref}$ or $S_n$. The rotation rate signal DR appears at the output of the downstream low-pass filter 31.

In the circuit of FIG. 3, the digital/analog converter and low-pass filter 13 serves to filter the desired rotation rate signal DR out of the signal generated in the digital circuit 10, 11 and 12. This circuit has the property that the desired rotation rate signal appears in the spectrum in the base band. The digital/analog converter and low-pass filter therefore need merely convert the digitally encoded values into analog ones and filter out the base band with a following low-pass filter. This can be done with the circuit described in FIG. 3. This circuit includes switches 16, 16a, which are embodied for instance as simple CMOS outputs of gates, which apply the inputs of the operational amplifier circuit 17 to ground or to a reference voltage Vref. The wiring of the operational amplifier 15 also requires the resistors 18, 19, 20 and 21. The low-pass filter following the operational amplifier 17 is identified by reference numeral 22. The requisite order of the low-pass filter depends on the given characteristics of the rotation rate sensor. For a 50 Hz bandwidth of the rotation rate signal, an oscillation frequency of the sensor and hence a carrier frequency $T_1$ of 2 kHz, and a 200 kHz fundamental frequency of the pulse-width-modulated acceleration signals, a third order low-pass filter is needed in order to achieve the desired filtering action.

The circuit of FIG. 3a functions analogously to the circuit of FIG. 3, except that here currents rather than voltages are switched.

With the signals V (sign) and D (data bit), a digital low-pass filter can also be acted upon directly, as an alternative to the analog output. Proceeding in this way is especially suitable for sigma-delta-encoded acceleration signals, since in such signals a scanning raster is already predetermined.

Figure 4:
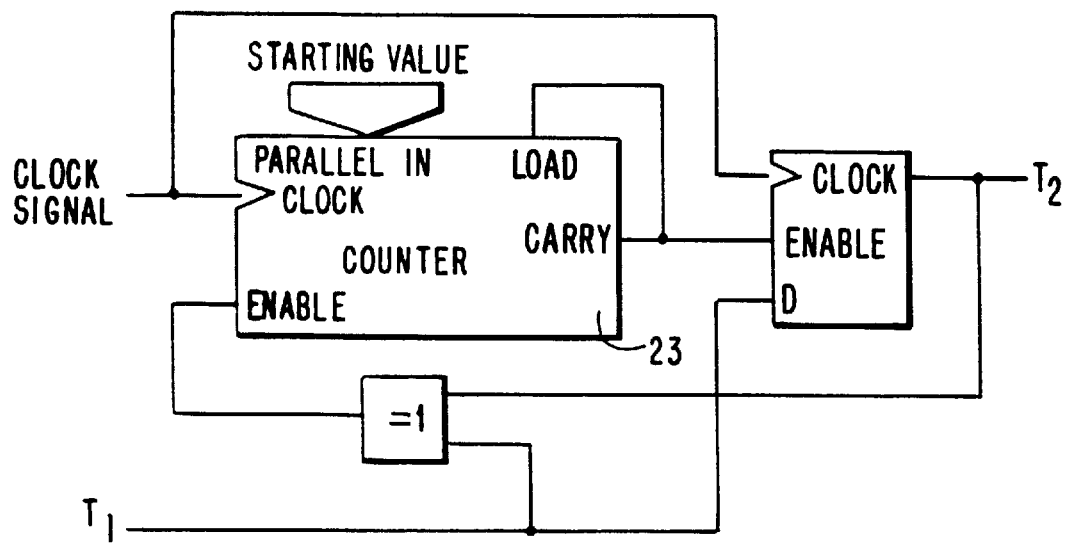
FIGS. 4 and 5 show two variants of digital phase shifters; the variant of FIG. 4 operates with a reference clock signal and that of FIG. 5 uses a monostable multivibrator.
Figure 5:
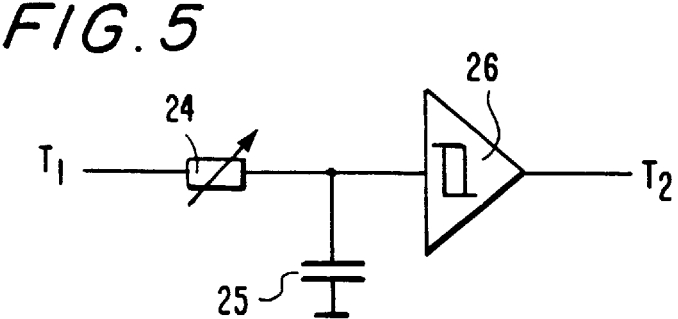

Examples for the design of a digital phase shifter 12 are shown in FIGS. 4 and 5. A digital phase shifter is needed in order to take into account phase rotations that occur in the acceleration sensors or acceleration sensor elements, and in order to furnish a carrier signal that is in phase with the Coriolis acceleration components.

In FIG. 4, a first variant of a digital phase shifter with a reference clock is shown. In this phase shifter, the phase shifting is set digitally via the starting value of the counter 23. For a carrier frequency $T_1$ of 2 kHz, a resolution of less than 0.1° is obtained with an 8 MHz clock. For a phase displacement from approximately zero to 180°, an eleven-bit counter is needed. Since the clock proceeds asynchronously with the carrier frequency, the phase-shifted carrier signal has phase jitter that is as high as the resolution. For a resolution of 0.1°, the phase jitter is accordingly also 0.1°. This phase jitter can be reduced by increasing the resolution, or in a second variant of this phase shifter by performing the clock generation with a phase locked loop (PLL), in which the clock signal is coupled in rigid phases with the carrier frequency $T_1$.

In a third variant in FIG. 5, the phase shifter may also be constructed using a monostable multivibrator. The phase shifting is then created with the aid of an RC member 24, 25. It can be followed by a gate with a Schmitt trigger input 26, if its characteristic hysteresis curve is located symmetrically between the supply voltages. If this is not the case, then instead of the gate with a Schmitt trigger input 26, a comparator is used, with a comparison voltage at half the supply voltage.

By the use of the above-described digital components, the rotation rate DR can be determined reliably and simply from the output signals A and B of the sensor elements of a rotation rate sensor.

What is claimed is:

1. A device for determining a rotation rate, having a rotation rate sensor which outputs one or two output signals (A or A and B), which among other things are a measure for the Coriolis acceleration and thus also for the rotation rate, characterized in that the output signals (A, B) are delivered in the form of pulse width modulated signals or sigma-delta signals to a digital evaluation circuit, which includes digital means for subtraction and multiplication of the signals and a digital phase shifter, to which the carrier signal ($T_1$) that induces the rotation rate sensor to oscillate is delivered, wherein the digital phase shifter puts the carrier signal ($T_1$) in phase with the Coriolis acceleration components, and the associated signal ($T_2$) is delivered to the means for multiplication, whose output signal is delivered to a digital/analog converter and low-pass filter (13), at whose output the rotation rate signal (DR) is available.

2. The device for determining a rotation rate of claim 1, characterized in that the rotation rate sensor includes an oscillatable body, which is set into constant oscillation by means of an oscillator, having one or more sensor elements, which are disposed on the oscillatable body and output the output signals (A or A and B).

3. The device for determining a rotation rate of claim 1, characterized in that the digital subtraction and the digital multiplication means are effected with the aid of a common Boolean switching network, to which the signals (A, B, $T_2$) are delivered, and that from this the items of information in the form of a positive switching signal ($S_p$), negative switching signal ($S_n$) for the D/A conversion and analog low-pass filtration, or a sign (V) and data bit (D) for further digital processing are formed.

4. The device for determining a rotation rate of claim 3, characterized in that the Boolean switching network includes solely means for complement formation (14) and NAND gates (15).

5. The device for determining a rotation rate of claim 1, characterized in that the Boolean switching network comprises only EXOR gates (27) and AND gates (28).

6. The device for determining a rotation rate of claim 3, characterized in that the Boolean switching network is the conversion of a truth table with the aid of logical means.

7. The device for determining a rotation rate of claim 1, characterized in that the digital/analog converter and low-pass filter has switches (16, 16a), which are built up in the form of CMOS outputs of gates and that apply the inputs of a downstream operational amplifier circuit (17) either to ground or to a reference voltage ($V_{ref}$).

8. The device for determining a rotation rate of claim 1, characterized in that the digital/analog converter and low-pass filter has semiconductor switches (29, 29a), which switch the current into the following operational amplifier circuit (30).

9. The device for determining a rotation rate of claim 1 characterized in that the low-pass filter (22) or (31) is of an order that is adapted to the desired frequency requirements.

10. The device for determining a rotation rate of claim 1, characterized in that the phase shifter (12) effects a phase rotation that compensates for the phase rotations occurring in the acceleration sensors, in order from the carrier signal ($T_1$) to generate a carrier signal ($T_2$) that is in phase with the Coriolis acceleration components that act on the sensor elements.

11. The device for determining a rotation rate of claim 1, characterized in that the phase shifter (12) includes at least one counter, and the phase displacement is set digitally via the starting value of the counter.

12. The device for determining a rotation rate of claim 1, characterized in that the phase shifter includes a phase locked loop (PLL), which generates a clock signal ($T_2$) that couples in rigid phase to the carrier frequency ($T_1$).

13. The device for determining a rotation rate of claim 1, characterized in that the phase shifter (12) includes an RC member with a variable resistor and a gate with a Schmitt trigger input or a comparator with a comparison voltage at half the supply voltage, and the carrier signal ($T_1$) is delivered via the resistor, and the phase-shifted carrier signal ($T_2$) occurs at the output of the gate or of the comparator.

\* \* \* \* \*